US011159742B2

(12) United States Patent
El Choubassi et al.

(10) Patent No.: US 11,159,742 B2
(45) Date of Patent: Oct. 26, 2021

(54) HIGH-SPEED VIDEO FROM CAMERA ARRAYS

(71) Applicant: Intel Corporation, Santa Clara, CA (US)

(72) Inventors: Maha El Choubassi, Santa Clara, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 15/198,727

(22) Filed: Jun. 30, 2016

(65) Prior Publication Data

US 2018/0007283 A1  Jan. 4, 2018

(51) Int. Cl.
| H04N 5/92 | (2006.01) |
| G11B 27/00 | (2006.01) |
| H04N 5/247 | (2006.01) |
| G11B 27/031 | (2006.01) |
| H04N 5/265 | (2006.01) |
| H04N 5/917 | (2006.01) |

(52) U.S. Cl.
CPC ........... *H04N 5/247* (2013.01); *G11B 27/005* (2013.01); *G11B 27/031* (2013.01); *H04N 5/265* (2013.01)

(58) Field of Classification Search
CPC ...... H04N 5/247; H04N 5/2226; H04N 5/232; G06T 5/005; G06T 11/40; G06T 7/00
USPC ........ 386/223, 326, 329, 278, 280; 345/582; 348/207.11; 382/154, 275
See application file for complete search history.

(56) References Cited

U.S. PATENT DOCUMENTS

| 8,861,840 B2 * | 10/2014 | Bell .................. G01S 17/89 345/582 |
| 2007/0030342 A1 * | 2/2007 | Wilburn ............. H04N 5/247 348/47 |
| 2014/0233847 A1 * | 8/2014 | Ratcliff ........... G06K 9/00228 382/154 |
| 2015/0348319 A1 | 12/2015 | Supikov et al. |

FOREIGN PATENT DOCUMENTS

KR  101451236 B1 * 10/2014  ............... G06T 7/00

OTHER PUBLICATIONS

Bai et al., "Selectively De-Animating Video", ACM Transactions on Graphics (Proceedings of SIGGRAPH 2012), 31(4), Jun. 2014, 10 pages, USA.
Bertalmio et al., "Image Inpainting", Proc. Comput. Graph (SIGGRAPH 2000), 12 pages, USA.
(Continued)

*Primary Examiner* — Daquan Zhao
(74) *Attorney, Agent, or Firm* — Hanley, Flight & Zimmerman, LLC

(57) ABSTRACT

An apparatus for high-speed video is described herein. The apparatus includes a camera array, wherein each camera of the camera array is to capture an image at a different time offset resulting in a plurality of images. The apparatus also includes a controller to interleave the plurality of images in chronological order and a view synthesis unit to synthesize a camera view from a virtual camera for each image of the plurality of images. Additionally, the apparatus includes a post-processing unit to remove any remaining artifacts from the plurality of images.

23 Claims, 13 Drawing Sheets

(56) References Cited

OTHER PUBLICATIONS

Bhat et al., "Using Photographs to Enhance Videos of a Static Scene", Proc. Eurographics Symposium on Rendering, 2007, 12 pages, USA.

Blain, Loz, "16 Cameras in One: Light Promises Smartphone Size and DSLR Image Quality," GizMag.com (now NewAtlas.com), http://www.gizmag.com/light-camera-combines-16-sensors/39764/, Oct. 8, 2015, 6 paegs, Australia.

Gautier et al., "Depth-Based Image Completion for View Synthesis", 3DTV Conference, 4 pages, France.

Harmer, Jim, "IPhone 6 Plus Camera In-Depth Review", Improvephotography.com, http://improvephotography.com/30019/iphone-6-camera-depth-review/, date viewed Jul. 8, 2016, 23 pages USA.

Hoyle, Andrew, "Huawei P9 Review", cnet.com, http://www.cnet.com/products/huawei-p9/, Apr. 30, 2016, 5 pages, USA.

Liu et al., "Content-Preserving Warps for 3D Video Stabilization", ACM Transactions on Graphics, vol. 28, No. 3, Article 44, Aug. 2009, 10 pages, USA.

Lucas et al., "An Interative Image Registration Technique with an Application to Stereo Vision", Proc 7th Int'l Joint Conference on Artificial Intelligence, 1981, 6 pages, USA.

Nickinson, Phil, "LG G5 Hands-On", AndroidCentral.Com (now MobileNations.com), http://www.androidcentral.com/lg-g5-hands-on, Feb. 21, 2016, 37 pages, Inverness, Florida, USA.

Perez et al., "Poisson Image Editing", ACM Trans. Graph., 2003, 6 pages, UK.

Pujades et al., "Bayesian View Synthesis and Image-Based Rendering Principals", Computer Vision and Pattern Recognition (CVPR), 27th IEEE Conference, 2014, 8 pages, France.

Raphael, Jr., "In Pictures: Here's What the HTC One's Dual Cameras Can Do", Computerworld.com, http://www.computerworld.com/article/2476104/smartphones/in-pictures--here-s-what-the-htc-one-s-dual-cameras-can-do.html, Mar. 31, 2014, 9 pages, USA.

Stefanoski et al., "Automatic View Synthesis by Image-Domaine-Warping", IEEE Transactions on Image Processing, Sep. 2013, 12 pages, Zurich.

Szeliski, Richard, "Computer Vision: Algorithms and Applications", 1st Ed., Springer-Verlag New York, Inc., 2010, 979 pages, New York, New York, USA.

Tomasi et al., "Detection and Tracking of Point Features", Carneigie Mellon University Technicial Report CMU-CS-91-132, Apr. 1991, 22 pages, USA.

Webb, Jonathan, Tiny Sea Snail 'swims like a bee', BBC News, date viewed Jul. 8, 2016, 12 pages, UK.

Wilburn et al., "High-Speed Videography Using a Dense Camera Array", CVPR 2004, Department of Electrical Engineering and Department of Computer Science, Stanford University, 8 pages, Stanford, California, USA.

Wilburn et al., "High Performance Imaging Using Large Camera Arrays", SIGGRAPH 2005, Department of Electrical Engineering and Department of Computer Science, Stanford University, date viewed Jul. 8, 2016, 12 pages, Stanford, California, USA.

Zitnick et al., "High-Quality Video View Interpolation Using a Layered Representation", In SIGGRAPH Conf. Proc., 2004, 9 pages, Redmond, Washington, USA.

Blanco, Xiomara, "Dell Venue 8 7000 review: A tablet that takes photography seriously", Cnet.com, https://www.cnet.com/products/dell-venue-8-7000/, Reviewed Feb. 9, 2015, updated Aug. 11, 2015, date viewed on-line Oct. 11, 2016, 7 pages, USA.

Pelican Imaging, "Augmented reality requires accurate depth data to complete the user experience", Pelicanimaging.com, http://www.pelicanimaging.com/solutions#mobile, date viewed Oct. 11, 2016, 7 pages, USA.

H. G. Dietz, "FourSee TDCI Multi-Camera," University of Kentucky, Department of Electrical and Computer Engineering, Center for Visualization & Virtual Environments, Jul. 10, 2015, 5 pages.

* cited by examiner

200B

200C

300

400

500

HIGH-SPEED VIDEO FROM CAMERA ARRAYS

BACKGROUND ART

Slow motion video is generally known as a video where time appears to be slowed down. Slow motion video is often rendered using image frames captured at a high frame rate. The slow motion video is realized by capturing a video at a much higher frame rate compared to the frame rate at which the video will be played back. When replayed at normal speed, time appears to be moving more slowly. Accordingly, video capture for slow motion videos typically uses image capture devices capable of image capture at a high frame rate.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
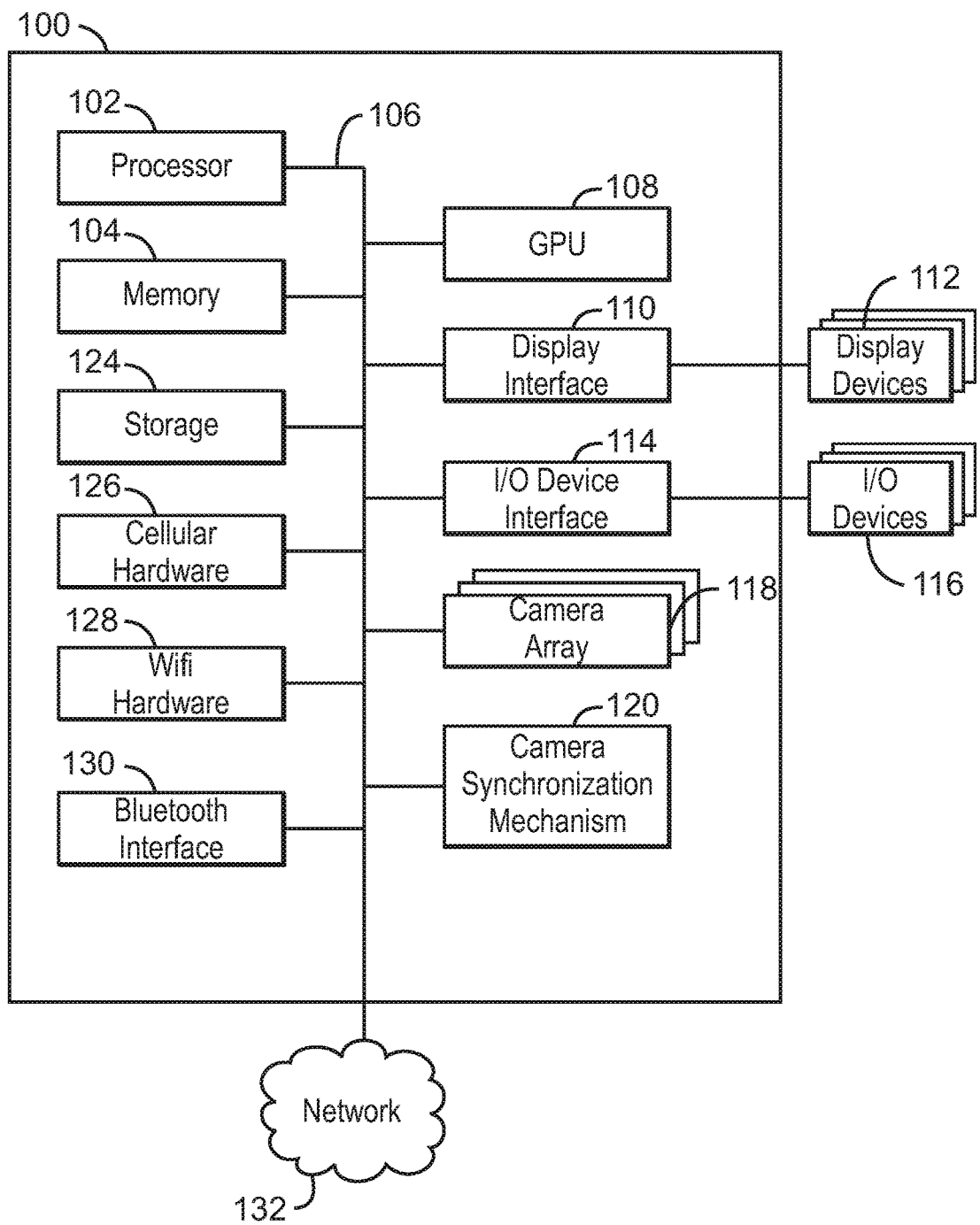
FIG. 1 is a block diagram of an electronic device that enables high-speed video capture.

As discussed above, slow motion videos are realized by capturing videos at a high frame rate. In particular, a high-speed video is acquired, where the high-speed video is a video captured at a very high frame rate. As used herein, a high frame rate may refer to a frame rate larger than the typical 30-60 frames per second (fps). When playing the captured video at frame rate lower that the high frame rate, the result is a slow motion "slo mo" video. Such slow motion videos enable details that are typically missed in real life to be detected. These details are usually not seen in a high-speed video played at its original high frame rate. Typically, slow motion videos are captured by a specialized camera that can function at such high-speed rates. Camera arrays constitute a popular configuration of cameras and have their own merit for bringing a class of new applications due to having multiple cameras in one device.

Embodiments of the present techniques enable high-speed video captured by a camera array. In embodiments, an algorithm leverages the multiplicity of the cameras to scale up the frame rate of each individual camera and generate a video at a frame rate that is multiple of the individual camera frame rates. Hence, in the case of low frame rate individual cameras, camera arrays can reach high-speed rates. Even if the individual cameras are already at high frame rate, the present techniques can multiply this rate and enable more applications that were not possible at the original rate.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enables high-speed video capture. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes data from a camera array.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes an array of cameras 118 for capturing high-speed video. In embodiments, the camera array 118 is an array of cameras, image capture devices, image capture mechanisms, image sensors, and the like. A camera synchronization mechanism 120 may be used to control the capture of images by the camera array 118. In particular, with an array of cameras, the camera synchronization mechanism can synchronize each camera to capture images at specific times. The frames captured by each camera can be interleaved or composited in temporal order, resulting in a video that samples the time dimension finer than a video captured by a single camera of the camera array.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

The high-speed video capture as described herein may be used in a variety of situations. For example, slow motion videos may be captured and used for application in sports, biology, photography, testing and manufacturing, among others. In sports, slow motion shots are typically used to emphasize special moments and possibly resolve uncertainties, e.g. violations such as offside in soccer. Slow motion videos may also highlight the dynamics of athletes' movements and can enhance coaching them. Another application is videography, where photographers can get slow motion footage of scenes or events. High-speed video technology is also used in science. For example, scientists have discovered the motion mechanism of the sea snail using high-speed video and flow-tracking systems. Moreover, high-speed video is also applied in manufacturing and testing, such as for monitoring how a car crashes, or how concrete cracks under pressure.

Devices that can capture high-speed videos are often specialized cameras that target niche applications. In some cases, smart phones may be used to capture slow motion videos, however video resolution is lowered to enable the slow motion videos. Camera arrays are desirable due to the creative features enabled by camera arrays, such as computing depth, refocusing images after capture, and creating panoramas. Due to the powerful applications they enable, camera arrays are making their way into mainstream devices.

With more than one camera, the present techniques enable the video frame rate to be scaled up beyond the individual frame rate of each camera and reach high-speed frame rates. By synchronizing the cameras so that each one starts capturing video at a different offset in time, then stacking the frames in the correct chronological order (even though the frames are from different cameras), a video is obtained with an effective frame rate that is multiple of the individual frame rate of each camera. In a camera array, the cameras may capture the scene from different perspectives. This results in frames not well aligned with respect to the scene, and a video that is jittery. According to the present techniques, the frames from each camera are processed so that the final high-speed video is visually acceptable. Accordingly, the present techniques enable an algorithm to generate a high-speed video from camera arrays with good perceptual quality.

Figure 2A:
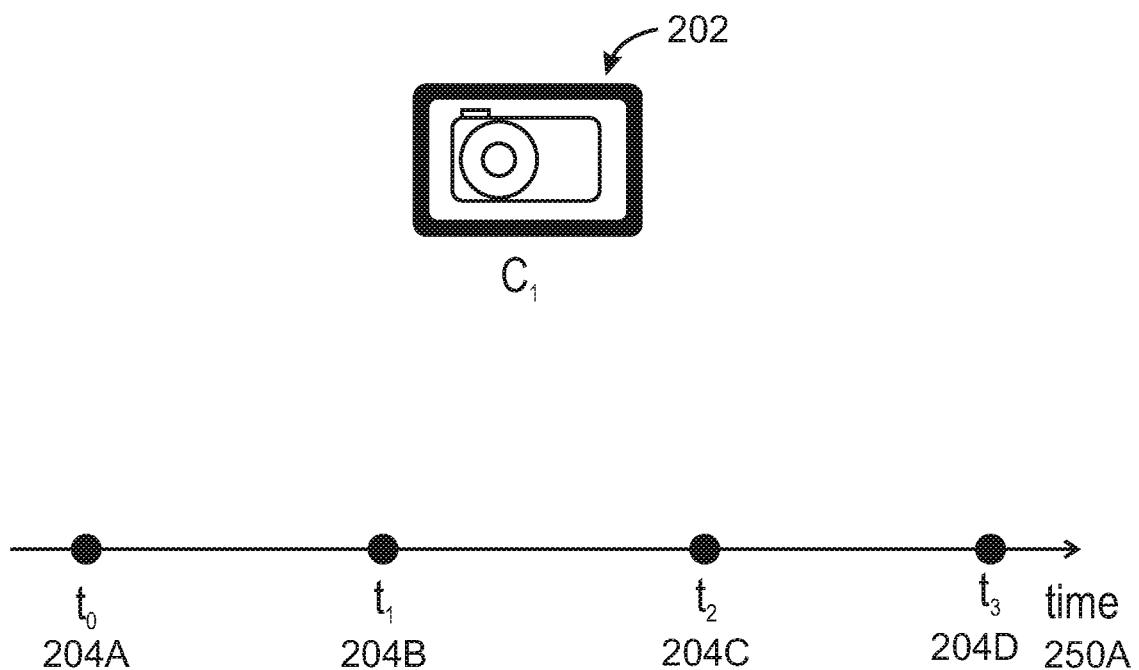
FIG. 2A is an illustration of image capture by a single camera.

FIG. 2A is an illustration of image capture 200A by a single camera 202. The single camera may capture images at a frame rate along a time line 250A. In particular, image capture may occur at t0 204A, t1 204B, t2 204C, and t3 204D. The frame rate of the camera 202 as F, where F is any frame rate such as 30 frames per second (fps), 60 fps, and so on.

Figure 2B:
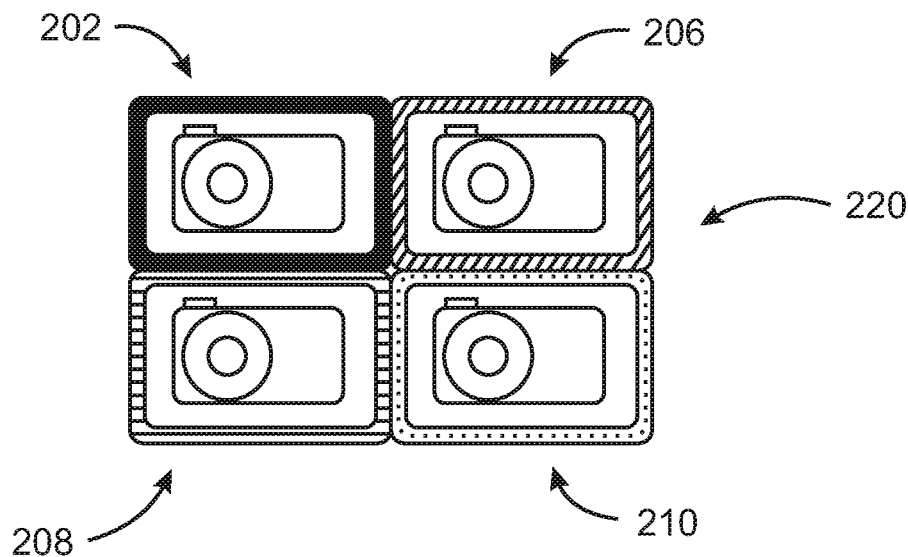
FIG. 2B is an illustration of image capture by a camera array.
Figure 2B:
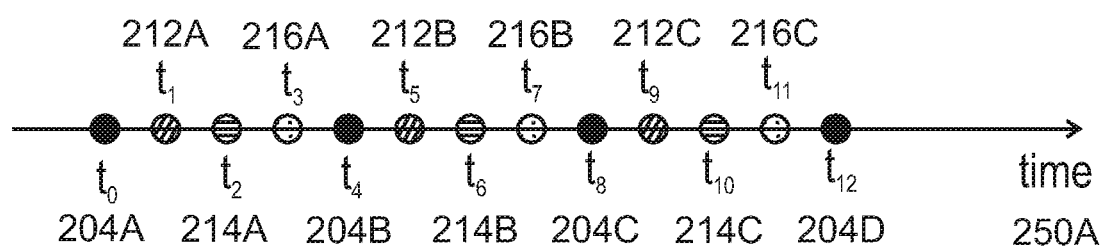

FIG. 2B is an illustration of image capture 200B by a camera array 220. The camera array 202 may include N cameras. In the example of FIG. 2B, N=4. Specifically, the camera array 220 includes a camera 202, a camera 206, a camera 208, and a camera 210. Each camera may capture images at a frame rate F. For ease of description, in the example of FIG. 2B, the frame rate is described as equal or the same for each camera. However, the cameras of the camera array 220 may capture images at different frame rates.

Given a camera array of N cameras, C1, C2, . . . CN, the image capture can be synchronized such that image capture among the camera array occurs at an offset. For example, in FIG. 2, image capture by camera 202 may occur at times t0 204A, t4 204B, t8 204C, and t12 204D, similar to the capture described in FIG. 2A. Image capture by camera 206 may occur at times t1 212A, t5 212B, and t9 212C. Image capture by camera 208 may occur at times t2 214A, t6 214B, and t10 212C. Finally, image capture by camera 210 may occur at times t3 216A, t7 216B, and t11 216C. As illustrated, image capture occurs in time order, beginning with t0 204A, t1 212A, t2 214A and so on through t12 204D.

Accordingly, image capture can be synchronized to start capturing at times t1, t2, . . . , to tM, where M is a total number of captured frames. By stacking or interleaving the frames from all cameras of the camera array in the correct temporal order, the result is a video that samples the time dimension much finer, actually M times finer, than the video captured by one single camera as illustrated in FIG. 2A. The effective frame rate of such a video is as follows:

Effective frame rate=$N \times F$ fps where N is the number of cameras, and F is the frame rate of each individual camera. In the case where each camera of the camera array has a different frame rate, the frame rates of each camera of the camera array can be summed to obtain an upper bound on the effective frame rate of the interleaved video.

Figure 2C:
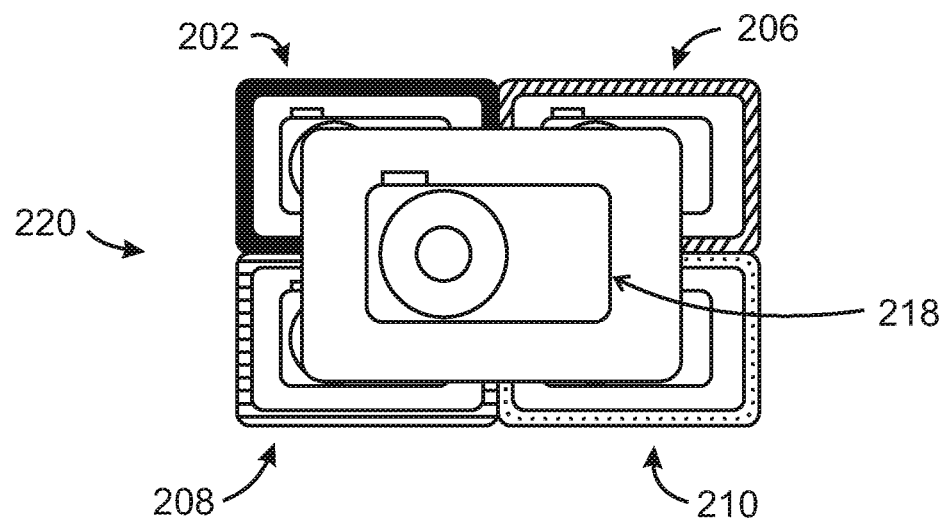
FIG. 2C is an illustration of image capture by a camera array and post-processing.
Figure 2C:
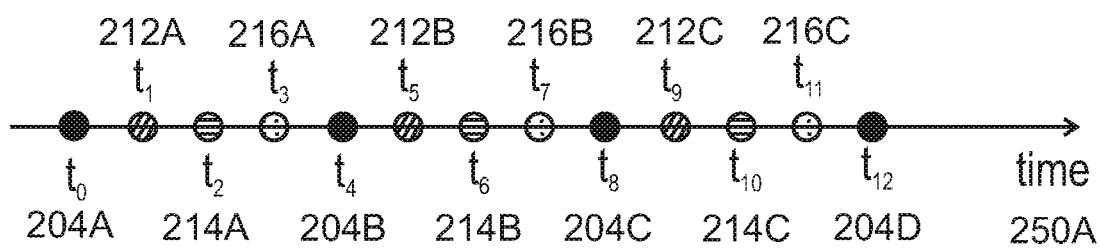
Figure 2C:
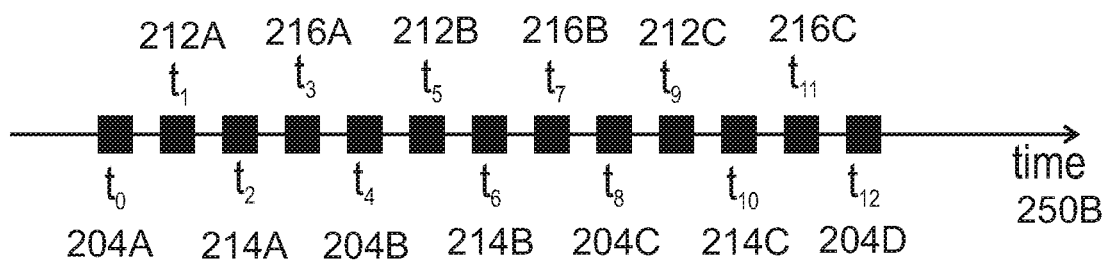

FIG. 2C is an illustration of image capture 200C by a camera array 220 and post-processing. A video that is formed by interleaving frames from all cameras in a camera array 220 may be jittery as a result of the different perspective observed by each camera, as illustrated along the time line 250A. In some cases, the raw interleaved video along the time line 250A may be very jittery and completely inadequate to view. In embodiments, a post-processing algorithm is applied to the raw video to smooth the video into a visually plausible high-speed video, as illustrated along a time line 250B. The post processing may include view synthesis. In view synthesis, a virtual camera 218 with a single perspective is selected. For every captured frame, in the raw interleaved video, a new view is synthesized from the virtual camera 218. The results are illustrated at the time line 250B, where each of the images captured at times t0 204A, t1 212A, t2 214A and so on through t12 204D have been processed so that they appear from the perspective of the virtual camera 218. Put another way, all the synthesized views will be from the perspective of the virtual camera 218. As a result, the video will be smooth and will not have the jitter.

Generally, depending on the view synthesis method used, additional post processing may be needed to reduce any potential remaining artifacts, such as inpainting or compositing. Also, note that the present techniques do not require the camera array to be static, and the virtual camera may also be moving if the camera array is moving. This may occur in, for example, a handheld usage of the device including the camera array. Assuming, without loss of generality, that each camera can capture video at F fps for simplicity of presentation, the effective frame rate of the resulting high-speed video is NxF fps.

Existing high-speed video capture solutions rely on a single camera that can capture images at high-speed frame rate. However, these cameras are typically expensive and often trade off spatial resolution to raise the frame rate. The present techniques leverage the multiplicity of cameras in a camera array to offer a video with frame rate N times larger than the frame rate of a single camera. In some cases, the multiplicity of cameras in a camera array may offer a video with frame rate that is the sum of all cameras in the camera array.

While the present techniques have been described in the context of high-speed video capture, the camera arrays may also be used in other applications, including depth-enabled applications for example. The frame rate of each camera in the array may not be high-speed due to cost considerations, but with the present techniques, high-speed video can be obtained from camera arrays without losing spatial resolution and while keeping the other features, such as depth capabilities. Even if the individual cameras have a high frame rate, the present techniques enable scaling up this rate to be even higher. Thus, a camera array consisting of a plurality of high-speed cameras may be configured to capture images such that the effective frame rate is a multiple or sum of the cameras in the high-speed camera array.

In some embodiments, a camera array may be positioned such that each camera of the array has the same perspective. For example, a camera array may include four cameras pointing inwards and one lens. In this example, the cameras may capture video at interleaving times as in FIG. 2B, but they are physically arranged so that each camera of the camera array is to capture the same perspective. While there is no need for an algorithm to align the frames when the cameras share the same perspective, this configuration is very specific for high-speed video only. It fails to provide any of the wider applications that usually come with camera arrays, such as depth, post capture photography (e.g. changing the focal plane or the aperture), and lightfield applications. Generally, most camera arrays purposefully have different perspective for every camera to get these capabilities. Accordingly, the present techniques enable high-speed video using camera arrays along with additional camera array specific applications.

Figure 3:
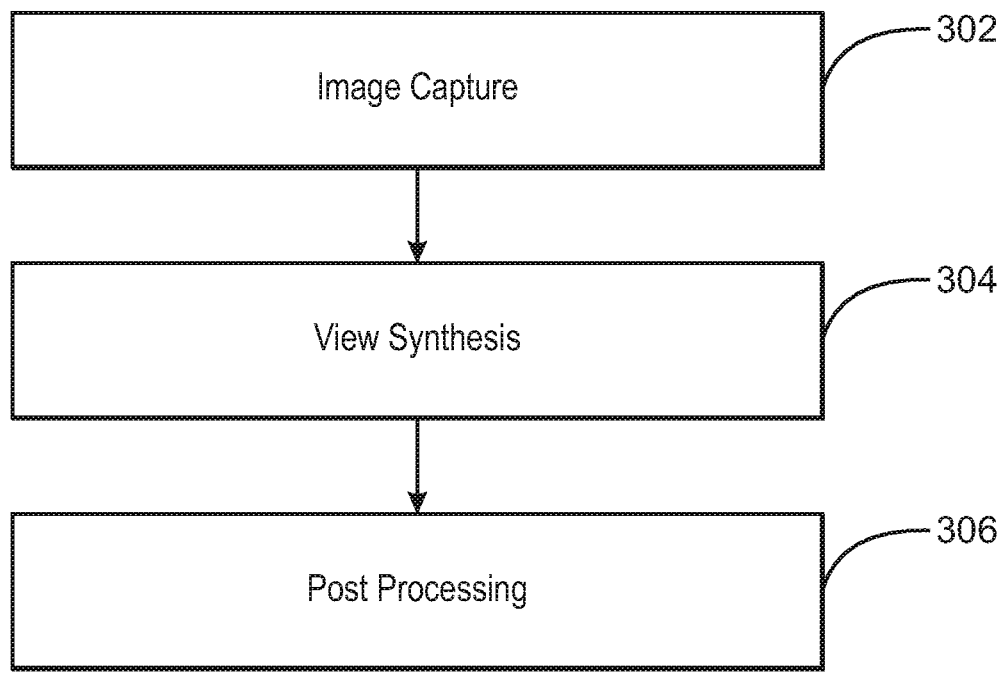
FIG. 3 is a process flow diagram of a method for high-speed video from a camera array.

FIG. 3 is a process flow diagram of a method 300 for high-speed video from a camera array. At block 302, images are captured by a camera array. The cameras C1, C2, ... CN of the camera array may be used to capture frames, where the timing of each capture is staggered or offset. Each frame may be placed in the in the correct temporal, chronological order. At block 304, view synthesis is performed. For every input frame, a new frame is synthesized from the perspective of the virtual camera position.

At block 306, post-processing is performed to generate a smooth video from the virtual camera. Post processing the synthesized views will remove any remaining artifacts. Generally, view synthesis algorithms according to block 304 will address regions around depth boundaries of close objects with large gaps in depth. By synthesizing the new views, any holes or occlusions may occur. Specifically, some regions are prone to artifacts due to large dis-occlusion when changing the perspective in the new synthesized view. For example, some view synthesis techniques may generate holes in the synthesized frames in these areas. For the holes, a post processing step of hole filling/inpainting is needed. Moreover, since the frames are from different cameras, color mapping may be used to reconcile the differences between their properties and have smoother looking video. As used herein, color mapping is a function that maps or transforms the colors of one image to the colors of another target image. In embodiments, color mapping may be referred to as a technique that results in the mapping function or the algorithm that transforms the image colors. A hole may refer to a break or discontinuity in the texture, mesh, or geometry of an image. Hole filling is a process of calculating, extracting, or determining appropriate values for the pixels or regions where holes appear. Similarly, inpainting may refer to the application of algorithms to replace lost or corrupted parts of the image data. In some cases, inpainting may be referred to as image interpolation or video interpolation. Other potential post processing steps are image compositing, as further described below.

Figure 4:
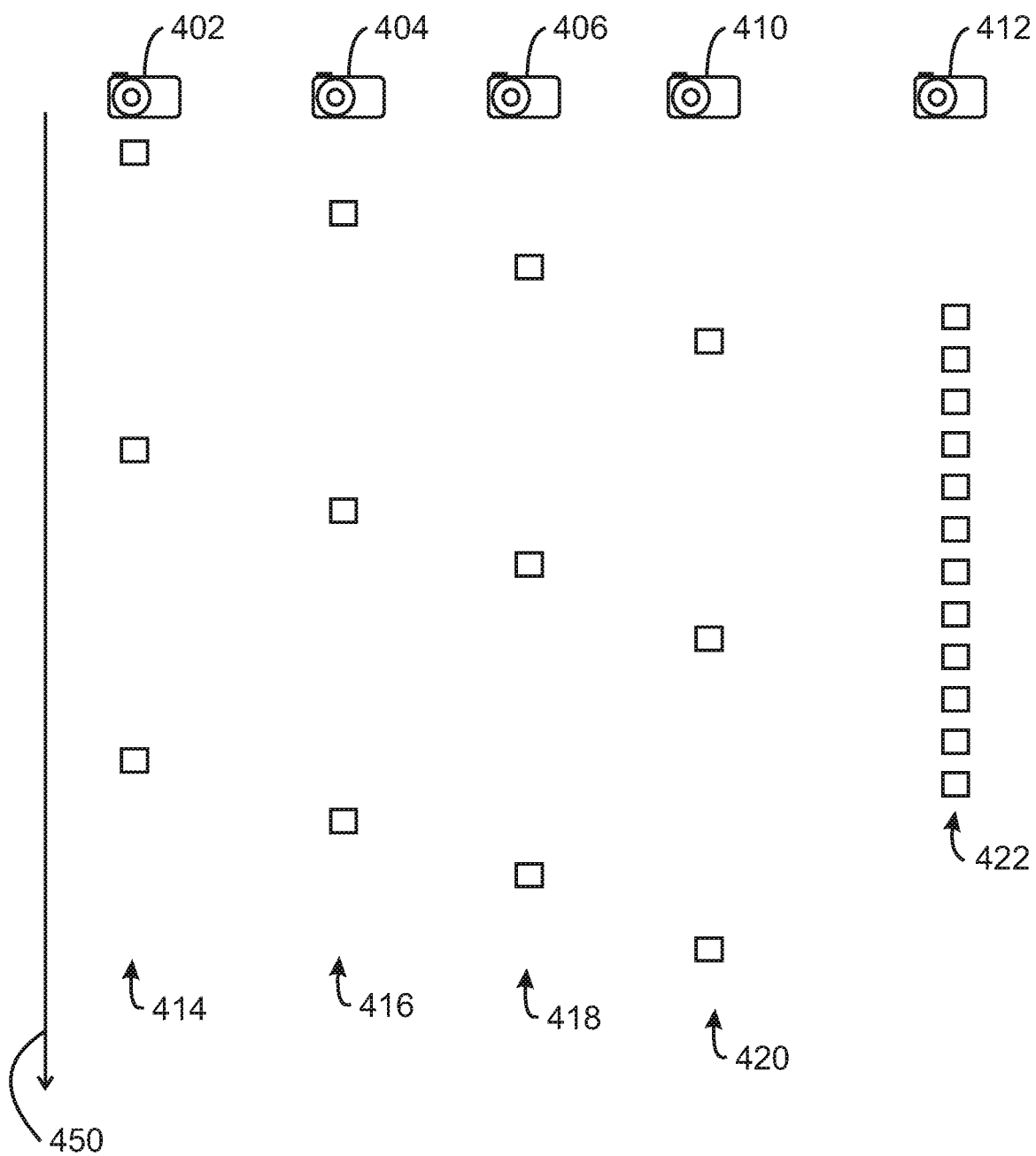
FIG. 4 is an illustration of a camera array with input and output according to the present techniques.

FIG. 4 is an illustration of a camera array 400 with input and output according to the present techniques. In FIG. 4, N=4, and time increases according to the time line 450. Input from the system includes frames 414, 416, 418, and 420 from four cameras 402, 404, 406, and 410, respectively, at interleaving times. The output includes frames 422 from virtual camera 412 with a speedup in frame rate by a factor of four.

Each of the frames 414, 416, 418, and 420 are used to synthesize frames 422 with synthesized camera views from the virtual camera 412. To ensure the best possible quality of the synthesized views, the virtual camera position is selected to be as close as possible to all cameras of the camera array. Accordingly, physical location of the virtual camera 412 may be at the center of the camera array 400, where the camera array includes cameras in a 2×2 grid. In this example, if each camera has a frame rate of 30 fps, the effective frame rate of the virtual camera is 4×30=120 fps. While a grid or rectangular layer of cameras has been described, the camera array as described herein may have any layout, such as circular, linear, triangular, or any other polygon or multi-linear layout.

Although particular techniques are described herein, many different algorithms may be used for view synthesis and post-processing, such as hole filling or inpainting. The present techniques are not limited to a specific view synthesis or post processing technique. In embodiments, content aware warping may be used for view synthesis, while image/video compositing is used for post processing.

Figure 5:
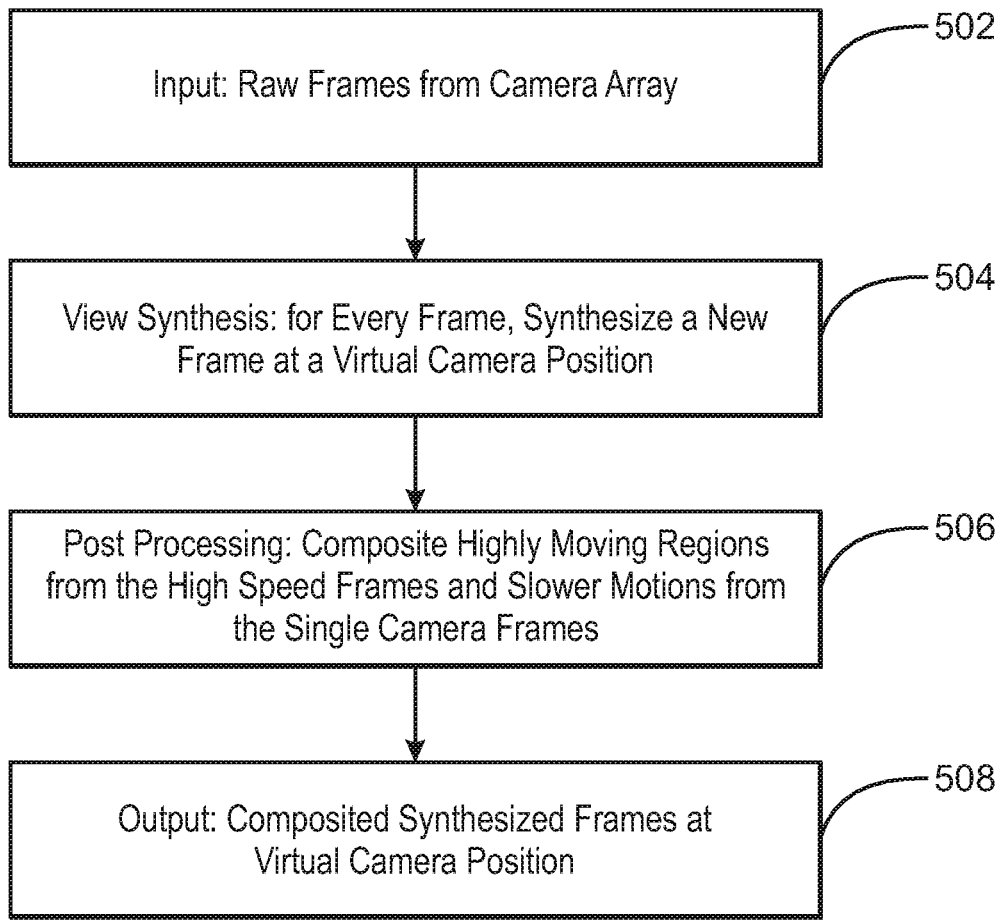
FIG. 5 is a process flow diagram of a method for high-speed video from a camera array.

FIG. 5 is a process flow diagram of a method 500 for high-speed video from a camera array. At block 502, raw camera frames are obtained from the camera array. In embodiments, the images are obtained from each camera in a round-robin fashion, thereby placing the frames in the correct temporal order. The frames may also be sent to a buffer as they are captured at an offset. Additionally, in embodiments, a controller may be used to ensure the frames are obtained and placed in the correct order.

At block 504, view synthesis is performed. For every frame, a new view is synthesized from a virtual camera position. In some cases, content aware warping is performed. In embodiments, content-aware warping is a fast technique to synthesize new views with a pleasing, plausible perceptual quality. As used herein, a plausible perceptual quality refers to the series of frames having little to no discernable jumps, jitters, or other artifacts. The regions around depth boundaries with large gaps in depth will not have holes, as this method stretches the texture in the regions to respond to disocclusion due to perspective change, hence implicitly filling the holes. When looking at each individual frame, it will look perceptually acceptable and the implicit hole filling is sufficient. On the other hand, the resulting video of interleaved synthesized views will be much better aligned than the raw interleaved frames, but it will still need some post processing. Indeed, in this intermediate resulting video, flickering may occur around the disocclusion regions surrounding objects that are static or very slowly moving, close to the camera, and/or with big gap depth from their background.

While stretching the texture is sufficient for good visual quality in individual frames coming from C1, C2 ... CN, there is no guarantee that this implicit hole filling is coherent across temporally consecutive frames coming from different cameras Ci and Cj. The flickering is caused by this mismatch in the regions around disocclusion areas in temporally adjacent frames. To fix this problem video compositing is used, which will also be more efficient for any compression.

Thus, view synthesis component synthesizes the new views from the new perspective. Content-aware warping processes the input target disparity or correspondences, which are often noisy and outputs a smooth/cured disparity, more appropriate to render perceptually pleasant view from the target virtual camera. In embodiments, target disparity may refer to a difference in image coordinates between a pair of frames, where each frame comes from a different camera pose. Point correspondences may refer to feature points in a pair of frames that occur due to the same object in the real world appearing at different places when captured from different camera positions. In content aware warping, the image with disparity or the image with point correspondences to the target are used to synthesize new views from the new perspectives. Using a dense disparity map or sparse point correspondences is a design knob that trades off quality versus complexity.

In embodiments, content aware warping processes the image and either disparity to the target (dense) or the point correspondences to the target (sparse) to determine the view from another perspective. The output of content aware warping may be a synthesized view from the target virtual camera. The output disparity does not need to cover the whole support of the image. For example, the disparity can be on a regular grid of vertices, which is a sample of the original dense image pixels positions. Solving for this sampled disparity is another parameter for a system designer to control the size of the problem, and hence balance computational complexity and memory requirements together with perceptual quality requirements.

To determine the sampled disparity, a cost function is formulated in terms of the desired disparity and minimize it as in Equation (1). The solution to this optimization problem is the sought disparity, which can be readily used to generate the synthetic view.

$$E(d_1, d_2, \ldots, d_N) = E_d(d_1, d_2, \ldots, d_N) + aE_s(d_1, d_2, \ldots, d_N)$$ Eqn. 1 where the data and the distortion terms are defined as $$E_d(d_1, d_2, \ldots, d_N) = \Sigma_{polygon\ p} \Sigma_n (o_n - w_n^t d^{p,t})^2$$ Eqn. 2

$$E_s(d_1, d_2, \ldots, d_N) = \Sigma_{polygon\ p} f(d^{p,t})$$ Eqn. 3

Note that the target disparities values are $d_1, d_2, d_N$ and the original values are $o_1, o_2, \ldots, o_M$. Additionally, $d^{p,t}$ is the vector containing the unknown values at vertices of polygon p of the grid. Variable $o_n$ is any point in polygon p and $w_n$ is the vector with the interpolation weights assigned to each vertex of polygon p for point on. For example, $w_n$ can be bilinear interpolation weights. Term $f(d^{p,t})$ is the perceptual distortion measure. One possible distortion measure is the sum of squared differences between pairs $d_i^{p,t}$ and $d_j^{p,t}$ of disparities values at the vertices of the polygon p. The data term constrains the desired disparities/depth $d_1, d_2, \ldots, d_N$ to be close/similar to the input disparity. At the same time, the distortion term enforces the perceptual constraints on $d_1, d_2, \ldots, d_N$ so that the generated view is acceptable perceptually. Many variations of the Equation (1) are possible depending on the application itself. For example, variants of Equation (1) include respectively for video stabilization, synthesizing views for autostereoscopic displays, and generating cinemagraphs.

In some cases, directly capturing RGBD data can result in a tradeoff with the high-speed speedup described above. For every frame captured by C1, C2 . . . and CN, content-aware warping requires as input both the RGB information and some depth information. This depth information may be in the form of a dense target disparity map or sparse point correspondences to the virtual camera. It is possible to capture RGBD data from the camera array for use as input with content aware warping. To obtain RGBD data, N cameras are grouped into N/2 stereo pairs and the depth is extracted. However, when using depth for the content aware warping, the resulting high-speed video will have a frame rate N/2×F fps, or half the increase frame rate when compare to the effective frame rate described with respect to FIGS. 2-4. Instead of sacrificing half the cameras for RGBD capture resulting in a lower effective frame rate, the present techniques can use all N cameras for high-speed capture and then estimate the target disparity map or point correspondences, and obtain the full speedup of factor N.

In embodiments, depth may be obtained by cascading tracking trajectories or flow maps. Since the camera arrays capture RGB images and not RGBD images, the frames from each of C1, C2 . . . and CN can be tracked. Depending on desired balance of quality versus computational complexity, the tracking can be either sparse or dense. Sparse tracking may use a Kanade-Lucas-Tomasi features tracker. In embodiments, dense tracking may be accomplished through the use of dense flow maps between consecutive frames. In the examples that follow, dense flow maps without loss of generality may be used for ease of description. However, the same techniques are applicable to sparse tracking.

In dense tracking, a forward flow is computed to the next frame and backward flow to the previous frame is computed as well. The flows are cascaded and used for interpolation to estimate the disparity from every frame to its target "to-be-synthesized" frame from the virtual camera. Again, the virtual camera is selected to be as close as possible to all the cameras, at the center of the camera array.

Figure 6A:
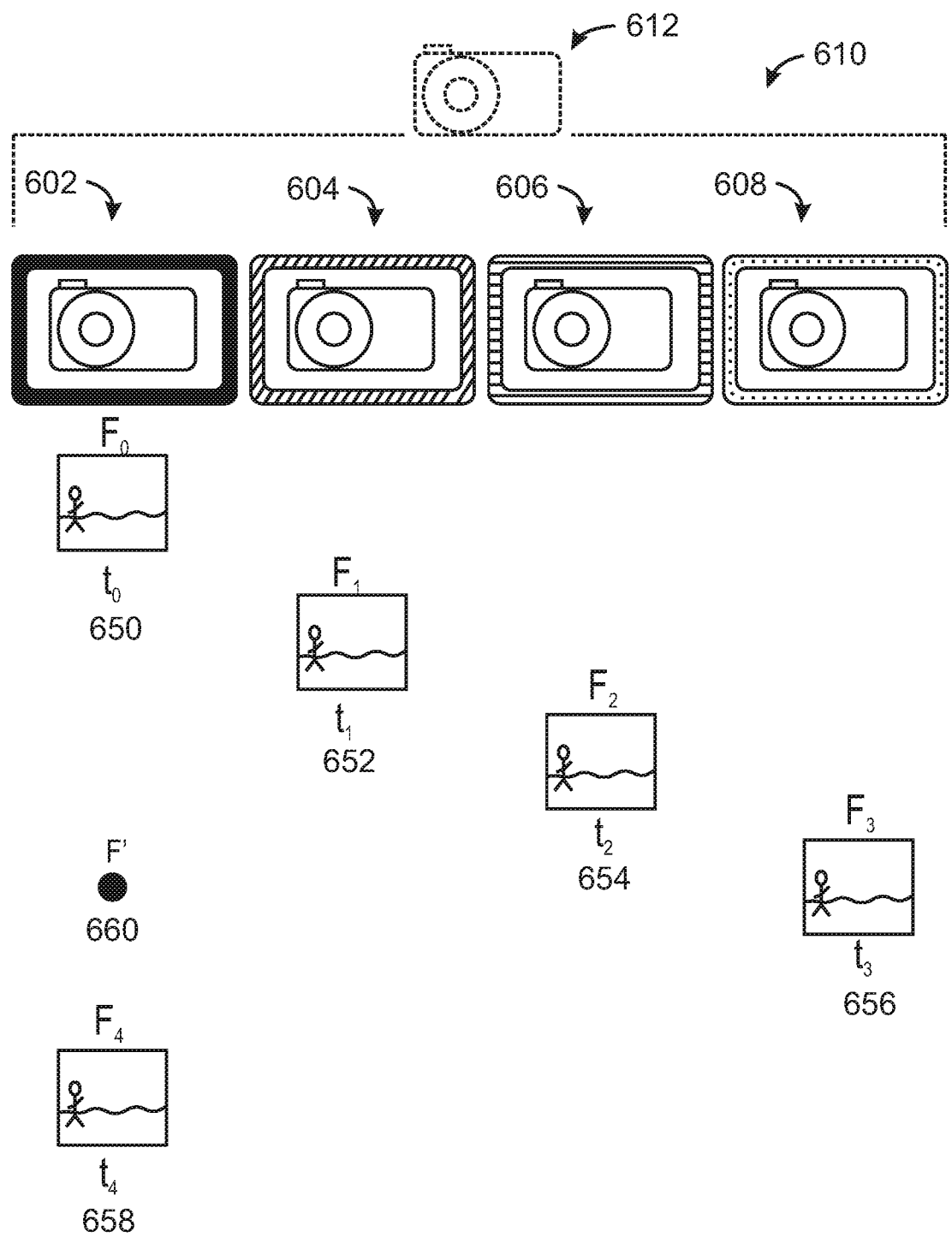
FIG. 6A is an example of calculating flow based disparities.

FIG. 6A is an example of calculating flow based disparities. In the example of FIG. 6A, all the cameras 602, 604, 606, and 608 of a camera array 610 are used for high-speed video capture according to the present techniques. Accordingly, the cameras 602, 604, 606, and 608 of a camera array 610 are capturing images or frames at staggered, offset, or interleaved times. Hence at any capturing instance, only one of the cameras captures a frame and all the remaining cameras are inactive. For example, in FIG. 6A, at a time t3 656, only camera 608 capture an image, where the image is frame F3. None of the other cameras captures at this time t3 656, including camera 602. A disparity map should be estimated frame F3 to F' 660, where F' is a corresponding synthesized view from the same perspective as camera 602, i.e., the hypothetical frame that would have been captured by camera 602 at the same time t3 656.

Figure 6B:
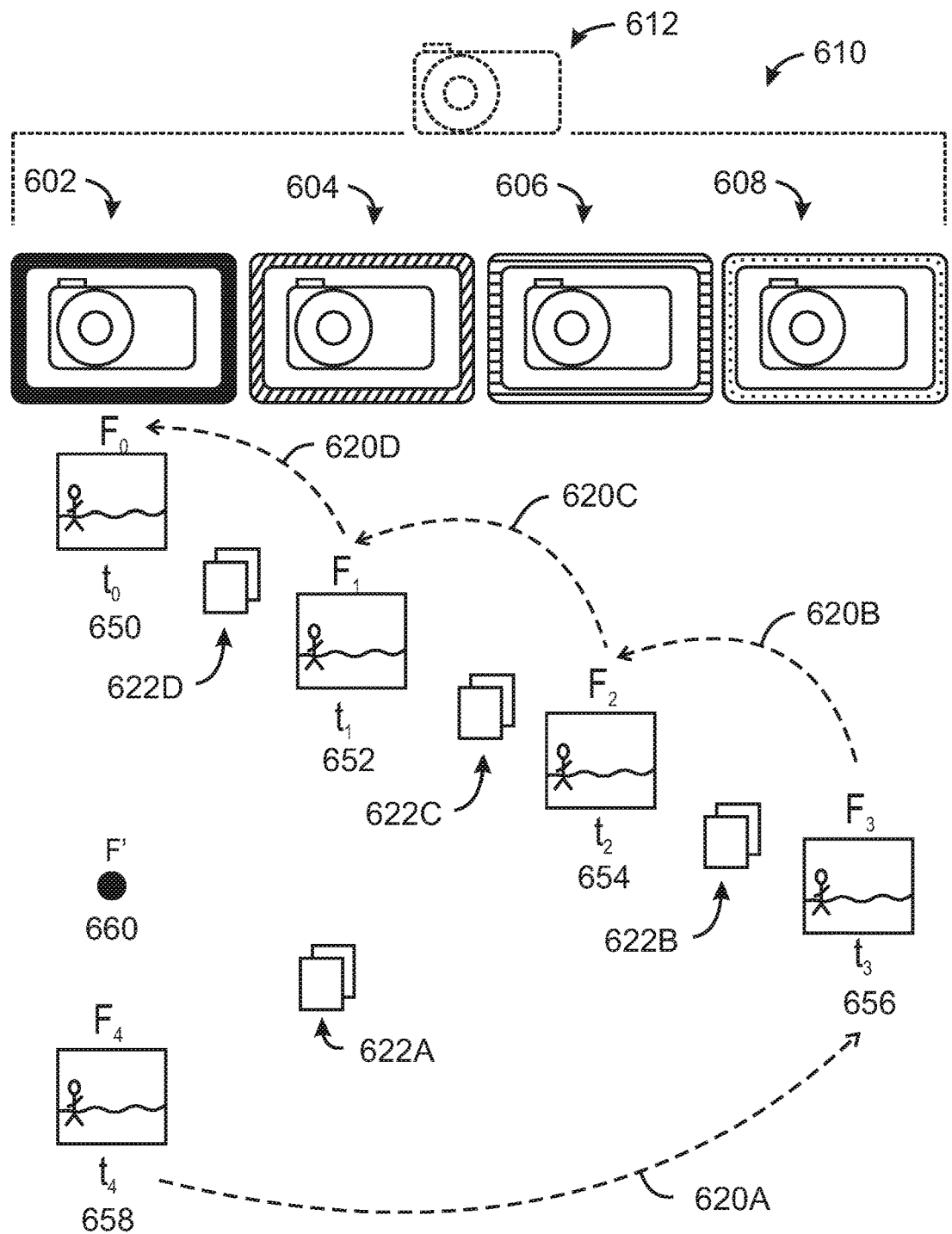
FIG. 6B is an example of cascading backward flows to calculate disparities.

FIG. 6B is an example of cascading backward flows to calculate disparities. The backward flows are cascaded as F4 to F3 620A, F3 to F2 620B, F2 to F1 620C, and F1 to F0 620D to estimate the flow F4 to F0. The cascading is done by accumulating the flow and forward mapping using bilinear interpolation. As a result, a pair of frames representing depth is found for each flow. FIG. 6B illustrates depth representations 622A, 622B, 622C, and 622D for each flow, resulting in an estimated flow from F4 to F0.

This flow from F4 to F0 is scaled by c/N. In the example of FIGS. 6A and 6B, N=4 (N=4 cameras) and the scaling factor is 0.25 to estimate the flow from F4 to F' 660. This scaling factor is based on time intervals between each image capture. The finest time interval between image capture using the camera array 610 is t2−t1, which is the same as t3−t2, t4−t3, etc. Thus, the time interval between each image capture is equal, and can be referred to as the unit time interval. The variable c may represent the number of unit time intervals between frame F4 and target frame F', which is equal to 1 in this case, as the separation between F4 658 and F' 660 is t5−t4.

Generally, the scalar is c/N, where 1≤c≤N−1, depending on the target time t. In the example of FIGS. 6A-6D, this results in the following calculation:

$$\frac{c}{N} = \frac{t4 - t3}{t4 - t0} = \frac{1}{4} = 0.25$$

where t4–t3 is the unit time interval between t5 and t4, and t5–t1 is the total number of time intervals between t4 and t0. The scaling is justified since F0 and F4 are temporally adjacent frames, each taken from the same camera 602. In embodiments, the scaling factor leverages the known relationship between the change in pixels from frame F0 at t0 650 to frame F4 at t4 658 to the hypothetical frame F'. Because of this relationship between frames F0 and F4, the motion between frames F0 and F4 can be approximated as linear. To obtain the estimated flow F3 to F', a forward flow 624 is cascaded from F3 to F4, and a backward flow 626 from F4 to F' 660 is estimated in FIG. 6C. The result is the estimated disparity map 670 from using the desired flow 628 from frame F3 to F' in FIG. 6D.

Figure 6C:
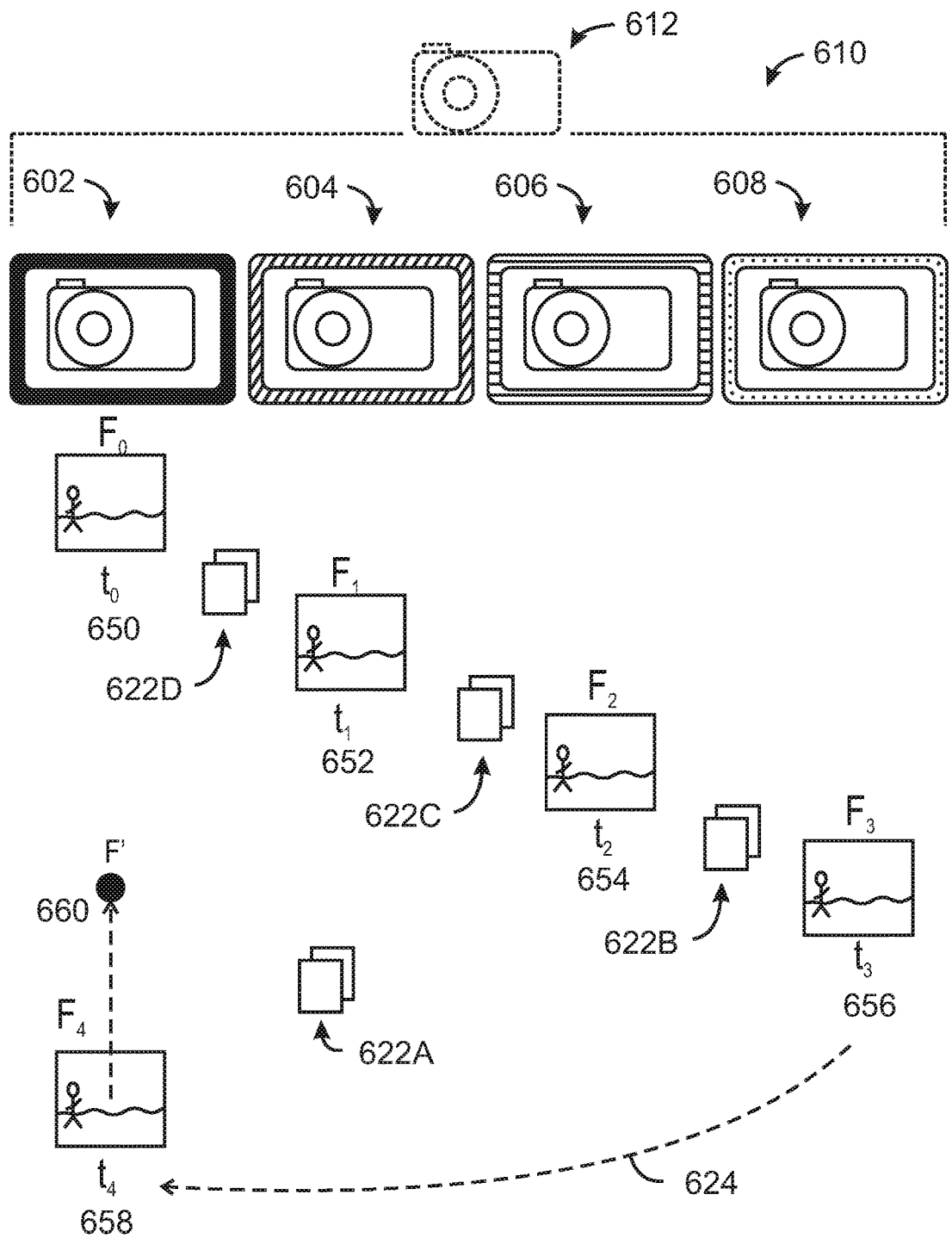
FIG. 6C is an example of estimating a forward flow.
Figure 6D:
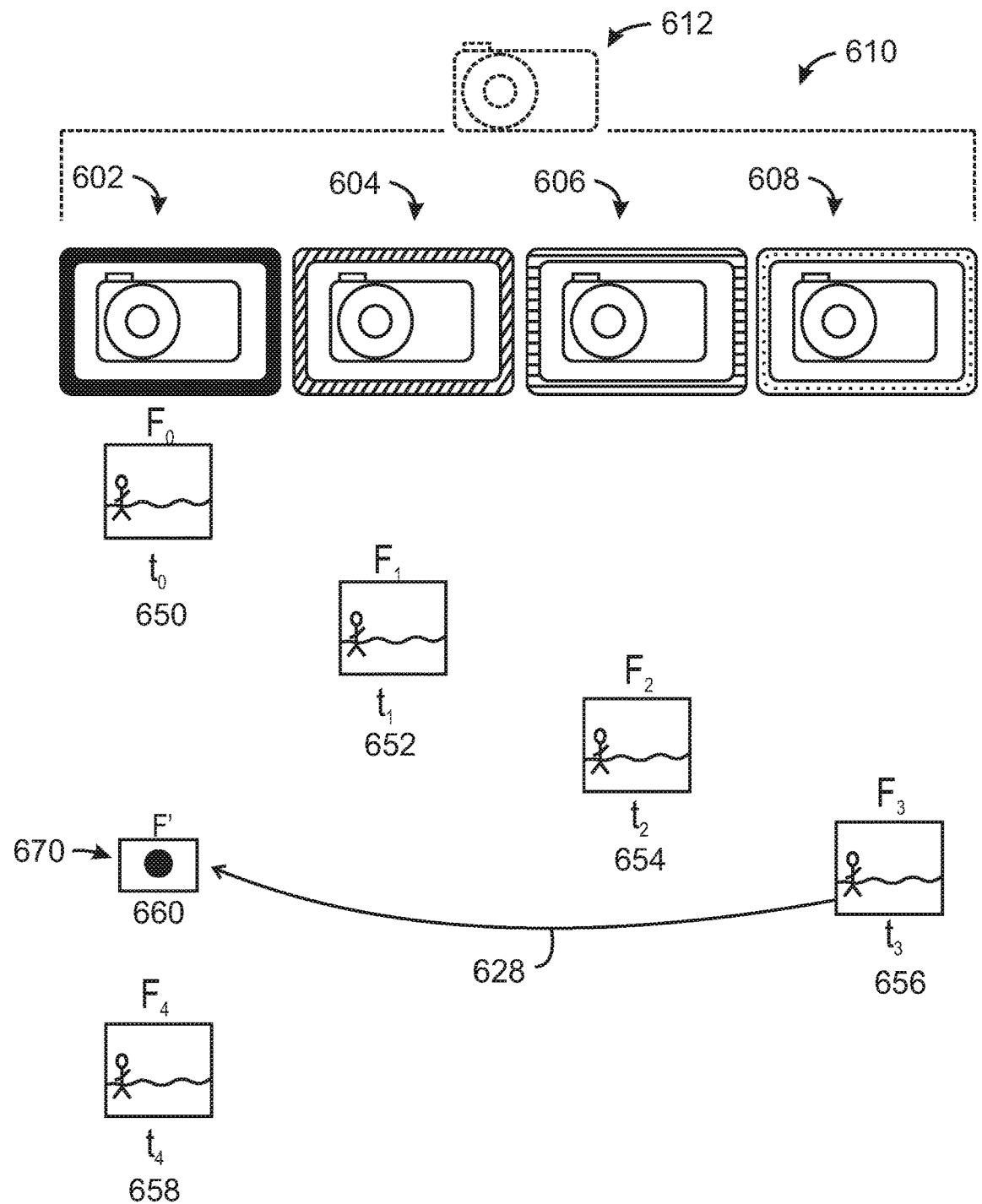
FIG. 6D is an example of estimating a disparity map.

As described by FIGS. 6B-6D, the disparity maps can be estimated from frame F3, the frame captured at time t3 656 by camera 608, to the hypothetical frames that would have been captured by all the remaining N–1 cameras, in this case 3 cameras: camera 602, camera 604, and camera 606. At this point, the desired target disparity map can be estimated from frame F3 to the virtual camera position as a weighted sum of all the estimated flows, using the weight 1/N. Using this weight, the target virtual camera is equidistant from each camera of the camera array. In embodiments, the virtual camera is located in the center of the camera array. Once the target disparity map has been calculated, content-aware warping can synthesize views from the virtual camera position using the source image and the target disparity map.

Referring now to FIG. 5, at block 506, the video including the synthesized views from the virtual camera position is composited. The resulting video after stacking the synthesized views is much more aligned than the original raw video. The remaining artifacts are visible in the disocclusion areas next to the static/slow regions, particularly the disoccluded areas with big gap in depth between a region close to the camera and its background. These artifacts are not present in the more moving regions as explained below.

Content-aware warping does not leave holes in the synthesized views. It conveniently results in implicit inpainting in disoccluded areas. In static regions or very slowly moving regions, the consecutive frames are expected to be exactly the same or very similar. However, in the high-speed video, consecutive frames come from different cameras and the implicit inpainting from content-aware warping slightly differs from one frame to the next. Due to this slight difference, human eyes will notice this alternating filling between the frames as the high-speed video plays, in static regions or very slowly moving regions. In significantly moving regions, this artifact is not seen, as the consecutive frames are anyway expected to be significantly different in these regions and will not have this alternating jittery filling.

In the case of slow motion videos, a high-speed frame rate is typically unnecessary in static or slow moving regions. The high frame rate is usually most desired in the highly moving regions. As described herein, a static or slow moving region areas that experience no or very little pixel change. No change in pixel values may indicate a person or an object that is not moving at all or very slowly moving. For example, a slow moving region may include a change in pixels every six frames a second. A high moving region contains areas that experience high amounts of pixel change that can indicate a person or object experiencing continuous movement. This may include, for example, a person running or a ball thrown in the air. Such movements are typically at speeds where changes occur in the order of 30 fps or higher. In some cases, a change in pixels greater than a threshold across a plurality of frames may be used determine if it is a slow moving region or a high moving region.

Since the high-speed frame rate is typically unnecessary in static or slow moving regions, in embodiments, the present techniques select one camera of the camera array as a reference camera and obtains image data for the static/slow regions from this camera. In the final video, every frame is comprised of the static/slow regions from single camera video and the moving regions from the full high-speed video. While fixing the visible distortions, the present techniques result in a video with adaptive frame rate, varying in the video based on amount of motion. Regions of the same frame may be rendered at different frame rates.

To accomplish this adaptive frame rate, in every synthesized view a mask and blending is applied to each frame. In every synthesized view, the highly moving regions and the remaining regions are identified to obtain a mask from the synthesized view. To identify the various regions, the temporal gradient of the video is analyzed. In embodiments, an image gradient represents the spatial derivative of an image, indicating the brightness variation within the image. In a sequence of images, the temporal gradient is the temporal derivative and gives information on changes between temporally consecutive frames, or in other words it gives information on motion. A new image may be found by integrating its target image gradient, which includes solving Poisson's equation.

Classical morphological image processing may be performed. Here, the classical morphological image processing enables the temporal gradient to be cured to eliminate noise and blend connected components together. As used herein, morphological image processing includes a set of operators that are used to transform images according to characteristics such as size, shape, convexity, connectivity, and geodesic distance. As a result of this processing, a mask is obtained that partitions the synthesized view into highly moving regions when compared to the other static\slow regions. In embodiments, if more accurate motion masks are desired, a graph-cut based approach may be used. In the graph cut approach, the problem of finding the masks can be formulated as solving a graph-cut problem for the mask labels. In some cases, the graph cut approach may result in heavier, more complex computations.

Having the masks, the final video may be generated by compositing. For each synthesized view and its mask, a new image is composited from two regions: the highly moving regions and the static/slow regions. The highly moving regions are obtained as indicated in the mask from the synthesized view itself. All remaining regions are then obtained, including static/slow regions, from the closest previous synthesized frame from the reference camera. While a particular technique for compositing has been described here, any compositing techniques may be used. For example, the present techniques can perform post processing compositing using the classical Poisson technique.

Through the processing described thus far, the present techniques generate a high-speed video that is perceptually pleasant. At the same time, this video is highly adequate for compression, as it uses the available bandwidth wisely. Moreover, the resulting video effectively has an adaptive frame rate, efficiently tailored to the amount of motion in the video, with low frame rate in static\slow regions and high frame rate in high-speed regions. This approach also solves the artifacts due to the impact of cameras differences. For example, the individual cameras in the camera array may have slight differences in their sharpness level, which may cause artifacts in the static and slow moving regions as above.

The present techniques should not be limited to the specific processing described above. For example, the present techniques can be used with a moving camera module. In this case, the view synthesis algorithm is applicable as is, since the tracked flow or features makes the present techniques adaptable to the camera motion. When post processing with a moving camera module, for every current frame, an extra step may be used for content aware warping all the previous frames to exactly to the same camera pose as the current frame to get correct compositing.

Figure 7:
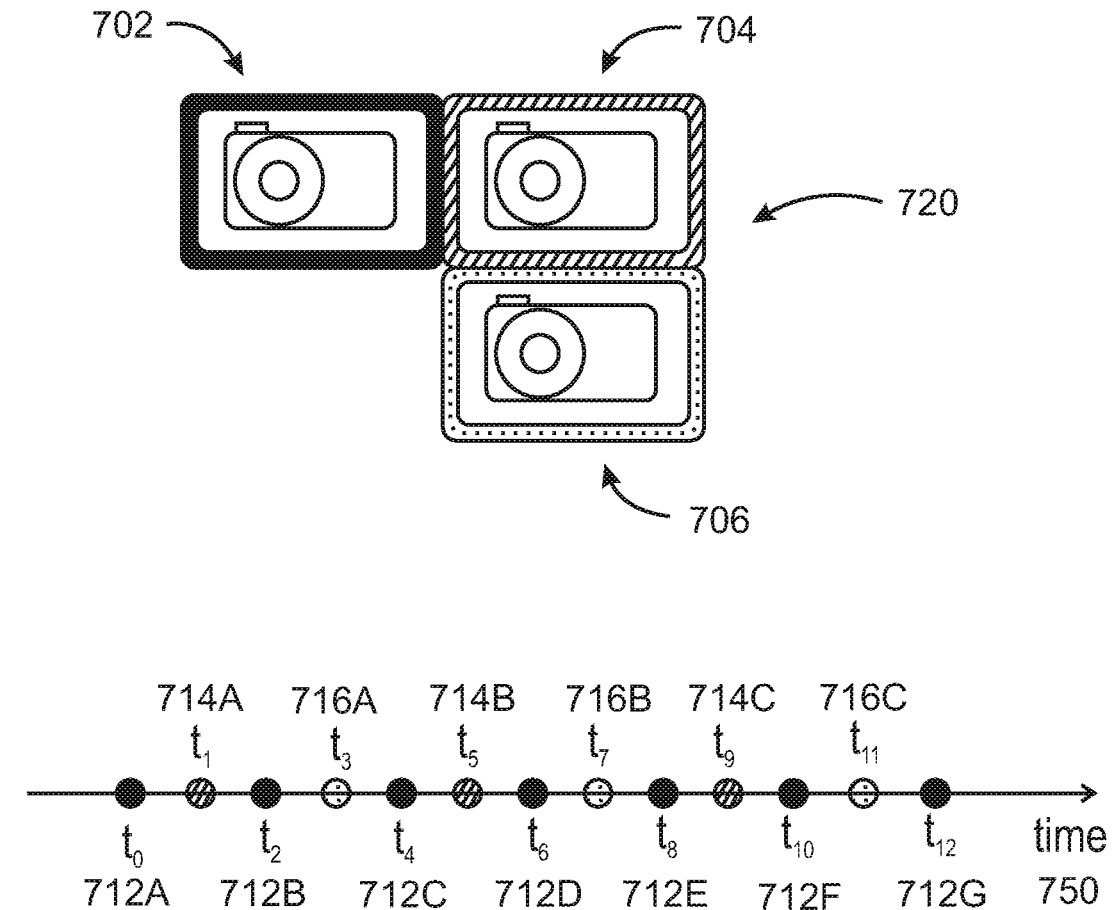
FIG. 7 is an illustration of image capture by a camera array with a non-uniform frame rate.

In the case of a non-uniform frame rate among the cameras of a camera array, sampling as described in FIGS. 2A-2D can be adjusted to match the frame rates of the cameras. For example, if the camera array had three cameras, with C2 704 and C3 706 at a frame rate F, and while camera C1 702 has a frame rate of 2F, then the high-speed video is also at 4×F fps. However, images from camera C3 706 is sampled twice more as illustrated in FIG. 7 along the timeline 750.

Overall, the present techniques provide a generic tool to scale up the frame rate for camera arrays, regardless of the frame rate of the individual cameras (whether it is low or high), without trading off spatial resolution, or requiring specialized highly sensitive sensors. Additionally, as seen in the details, the final high-speed video we generate is more adequate for compression as it will have adaptive frame rate, spatio-temporally varying in the video, based on the amount of motion. Highly moving areas will have higher frame rate, and slow/static areas will have smaller frame rate.

Figure 8:
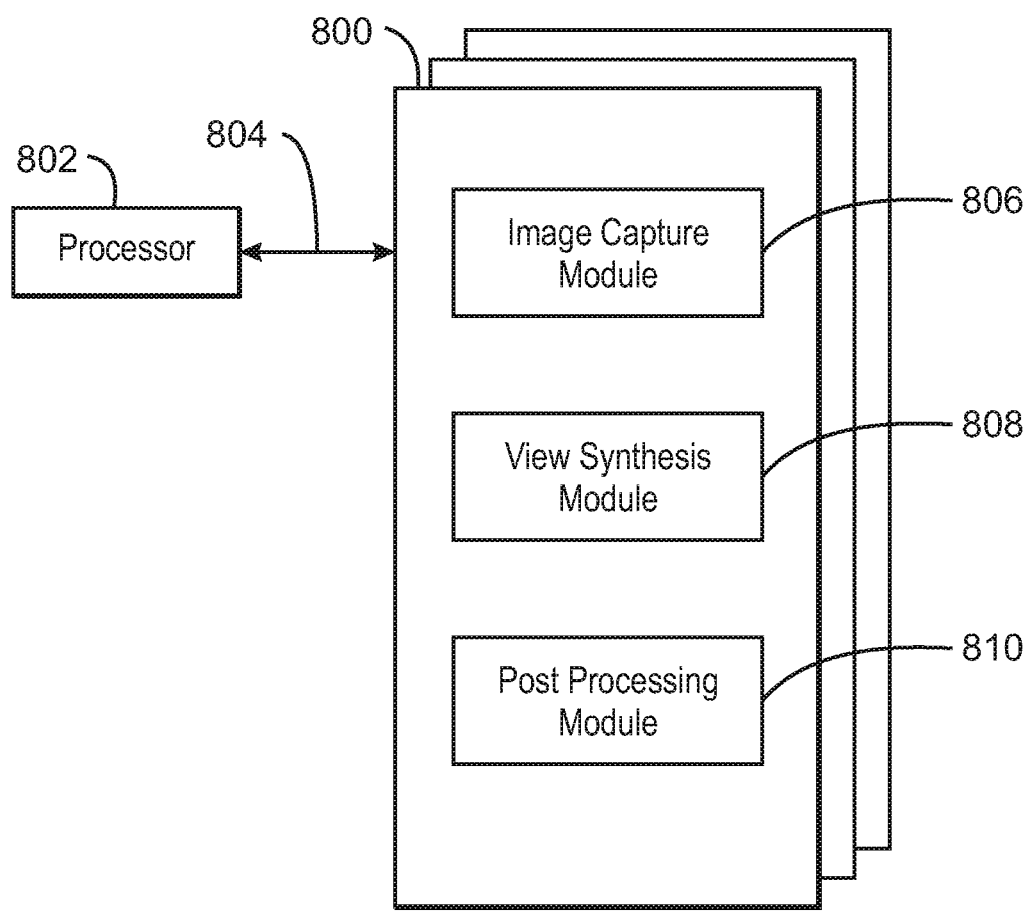
FIG. 8 is a block diagram showing a medium that contains logic for enabling a high-speed video capture using a camera array.

FIG. 8 is a block diagram showing a medium 800 that contains logic for enabling a high-speed video from a camera array. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 806-810 configured to perform the techniques described herein. For example, an image capture module 806 may be configured to capture images in an interleaved fashion. A view synthesis module 808 may be configured to synthesize a new frame for every input interleaved frame from the perspective of the virtual camera position. In embodiments, view synthesis may be performed via content aware warping. A post-processing module 810 may be configured to generate a smooth video from the virtual camera. In embodiments, post processing includes compositing. In some embodiments, the modules 806-810 may be modules of computer code configured to direct the operations of the processor 802.

The block diagram of FIG. 8 is not intended to indicate that the medium 800 is to include all of the components shown in FIG. 8. Further, the medium 800 may include any number of additional components not shown in FIG. 8, depending on the details of the specific implementation.

Example 1 is an apparatus for high-speed video. The apparatus includes a camera array, wherein each camera of the camera array is to capture an image at a different time offset resulting in a plurality of images; a controller to interleave the plurality of images in chronological order; a view synthesis unit to synthesize a camera view from a virtual camera for each image of the plurality of images; and a post-processing unit to remove any remaining artifacts from the plurality of images.

Example 2 includes the apparatus of example 1, including or excluding optional features. In this example, post processing removes holes caused by synthesizing a camera view from a virtual camera.

Example 3 includes the apparatus of any one of examples 1 to 2, including or excluding optional features. In this example, post processing removes the remaining artifacts due to holes filled incoherently during view synthesis.

Example 4 includes the apparatus of any one of examples 1 to 3, including or excluding optional features. In this example, color mapping is used to reconcile color differences between each image.

Example 5 includes the apparatus of any one of examples 1 to 4, including or excluding optional features. In this example, the resulting frame rate is N times larger than the frame rate of a single camera.

Example 6 includes the apparatus of any one of examples 1 to 5, including or excluding optional features. In this example, each camera image has a different perspective compared to other camera images and synthesizing a camera view from each image results in a single view point.

Example 7 includes the apparatus of any one of examples 1 to 6, including or excluding optional features. In this example, the camera array is arranged to enable high-speed video, depth applications, and post capture photography.

Example 8 includes the apparatus of any one of examples 1 to 7, including or excluding optional features. In this example, a frame rate of a video rendered using the plurality of images is an adaptive frame rate, spatio-temporally varying in each frame, based on the amount of motion in regions of the synthesized camera views.

Example 9 includes the apparatus of any one of examples 1 to 8, including or excluding optional features. In this example, a perspective of the virtual camera is positioned at the center of the camera array.

Example 10 includes the apparatus of any one of examples 1 to 9, including or excluding optional features. In this example, a perspective of the virtual camera is selected to be as close as possible to all cameras of the camera array.

Example 11 includes the apparatus of any one of examples 1 to 10, including or excluding optional features. In this example, the view synthesis unit is to synthesize camera views via content aware warping.

Example 12 is a method for high-speed video from a camera array. The method includes capturing a plurality of frames using the camera array, wherein each camera of the camera array is to capture a frame at a different time offset; stacking the plurality of frames in chronological order; synthesizing a view from a single perspective for each frame of the plurality of frames; and processing the synthesized camera views to remove artifacts in the images to render a slow motion video.

Example 13 includes the method of example 12, including or excluding optional features. In this example, synthesizing the view includes hole-filling or inpainting for each frame.

Example 14 includes the method of any one of examples 12 to 13, including or excluding optional features. In this example, synthesizing the view includes content aware warping. Optionally, content aware warping comprises: obtaining a point correspondence between a frame and the single perspective; calculate a disparity to minimize a sum of squared differences between distortion terms; generating the synthesized view based on the disparity.

Example 15 includes the method of any one of examples 12 to 14, including or excluding optional features. In this example, synthesizing the view includes content aware warping that synthesizes a view based on a dense disparity map or a sparse point correspondence. Optionally, the dense disparity map and the sparse point correspondence are estimated by cascading tracking trajectories or flow maps.

Example 16 includes the method of any one of examples 12 to 15, including or excluding optional features. In this example, the synthesized camera views are processed to remove disocclusion areas.

Example 17 includes the method of any one of examples 12 to 16, including or excluding optional features. In this example, the synthesized camera view is processed to realize an adaptive frame rate that varies across the video according to an amount of motion. Optionally, the adaptive frame rate is achieved using a mask. Optionally, the mask is generated using morphological image processing.

Example 18 includes the method of any one of examples 12 to 17, including or excluding optional features. In this example, processing the synthesized camera view comprises obtaining highly moving regions as indicated by a mask from the synthesized view, and obtaining all remaining regions from a closest precedent synthesized frame from a reference camera.

Example 19 is a system for high speed video from a camera array. The system includes a display; a camera array; a memory that is to store instructions and that is communicatively coupled to the camera array and the display; and a processor communicatively coupled to the camera array, the display, and the memory, wherein when the processor is to execute the instructions, the processor is to: capture a plurality of frames using the camera array, wherein each camera of the camera array is to capture an image at a different time offset resulting in a plurality of images; interleave the plurality of images in an order of capture; synthesize a view from a single perspective for each image of the plurality of images; and process the synthesized camera views to remove artifacts in the images.

Example 20 includes the system of example 19, including or excluding optional features. In this example, processing the synthesized camera views removes holes caused by synthesizing a camera view from a virtual camera.

Example 21 includes the system of any one of examples 19 to 20, including or excluding optional features. In this example, processing the synthesized camera views removes the remaining artifacts due to holes filled incoherently during view synthesis.

Example 22 includes the system of any one of examples 19 to 21, including or excluding optional features. In this example, processing the synthesized camera views comprises color mapping that is to reconcile color differences between each image.

Example 23 includes the system of any one of examples 19 to 22, including or excluding optional features. In this example, an effective frame rate is N times larger than a frame rate of a single camera of the camera array.

Example 24 includes the system of any one of examples 19 to 23, including or excluding optional features. In this example, the camera array is arranged to enable high-speed video, depth image capture, and post-capture photography.

Example 25 includes the system of any one of examples 19 to 24, including or excluding optional features. In this example, the frame rate of the synthesized camera views is an adaptive frame rate, spatio-temporally varying across the synthesized camera views, based on the amount of motion in regions of the synthesized camera views.

Example 26 includes the system of any one of examples 19 to 25, including or excluding optional features. In this example, a perspective of the synthesized camera views is positioned at a center of the camera array.

Example 27 includes the system of any one of examples 19 to 26, including or excluding optional features. In this example, a perspective of the synthesized camera views is selected to be as close as possible to all cameras of the camera array.

Example 28 includes the system of any one of examples 19 to 27, including or excluding optional features. In this example, the synthesized camera views are synthesized via content aware warping.

Example 29 includes the system of any one of examples 19 to 28, including or excluding optional features. In this example, a slow motion video is rendered by compositing the synthesized camera views. Optionally, compositing comprises obtaining a new image that comprises a highly moving region and a static region for each synthesized view.

Example 30 is a tangible, non-transitory, computer-readable medium. The computer-readable medium includes instructions that direct the processor to capture a plurality of frames using the camera array, wherein each camera of the camera array is to capture an image at a different time offset resulting in a plurality of images; stack the plurality of images in chronological order; synthesize a view from a single perspective for each image of the plurality of images; and process the synthesized camera views to remove artifacts in the images to render a slow motion video.

Example 31 includes the computer-readable medium of example 30, including or excluding optional features. In this example, synthesizing the view includes hole-filling or inpainting for each frame.

Example 32 includes the computer-readable medium of any one of examples 30 to 31, including or excluding optional features. In this example, synthesizing the view includes content aware warping. Optionally, content aware warping comprises: obtaining a point correspondence between a frame and the single perspective; calculate a disparity to minimize a sum of squared differences between distortion terms; generating the synthesized view based on the disparity. Optionally, content aware warping synthesizes a view based on a dense disparity map or a sparse point correspondence. Optionally, the dense disparity map and the sparse point correspondence are estimated by cascading tracking trajectories or flow maps.

Example 33 includes the computer-readable medium of any one of examples 30 to 32, including or excluding optional features. In this example, the synthesized camera views are processed to remove disocclusion areas.

Example 34 includes the computer-readable medium of any one of examples 30 to 33, including or excluding optional features. In this example, the synthesized camera view is processed to realize an adaptive frame rate that varies across within each frame according to an amount of motion. Optionally, the adaptive frame rate is achieved using a mask. Optionally, the mask is generated using morphological image processing.

Example 35 includes the computer-readable medium of any one of examples 30 to 34, including or excluding optional features. In this example, processing the synthesized camera view comprises obtaining highly moving regions as indicated by a mask from the synthesized view, and obtaining all remaining regions from a closest previous synthesized frame from a reference camera and blending a highly moving region and a remaining region for each frame.

Example 36 is an apparatus for high-speed video. The apparatus includes instructions that direct the processor to a camera array, wherein each camera of the camera array is to capture an image at a different time offset resulting in a plurality of images; a means to interleave the plurality of images in chronological order; a means to synthesize a camera view to synthesize a camera view from a virtual camera for each image of the plurality of images; and a means to remove artifacts to remove any remaining artifacts from the plurality of images.

Example 37 includes the apparatus of example 36, including or excluding optional features. In this example, the means to remove artifacts removes holes caused by synthesizing a camera view from a virtual camera.

Example 38 includes the apparatus of any one of examples 36 to 37, including or excluding optional features. In this example, the means to remove artifacts removes the remaining artifacts due to holes filled incoherently during view synthesis.

Example 39 includes the apparatus of any one of examples 36 to 38, including or excluding optional features. In this example, color mapping is used to reconcile color differences between each image.

Example 40 includes the apparatus of any one of examples 36 to 39, including or excluding optional features. In this example, the effective frame rate of a video rendered using the plurality of images is N times larger than the frame rate of a single camera.

Example 41 includes the apparatus of any one of examples 36 to 40, including or excluding optional features. In this example, each image has a different perspective compared to other images captured by other cameras of the camera array and synthesizing a camera view for each image results in a single perspective for the plurality of images.

Example 42 includes the apparatus of any one of examples 36 to 41, including or excluding optional features. In this example, the camera array is arranged to enable depth applications, post capture photography, or any other application that requires a camera array.

Example 43 includes the apparatus of any one of examples 36 to 42, including or excluding optional features. In this example, a frame rate of a video rendered using the plurality of images is an adaptive frame rate, spatio-temporally varying across the synthesized camera views, based on the amount of motion in regions of the synthesized camera views.

Example 44 includes the apparatus of any one of examples 36 to 43, including or excluding optional features. In this example, a perspective of the virtual camera is positioned at the center of the camera array.

Example 45 includes the apparatus of any one of examples 36 to 44, including or excluding optional features. In this example, a perspective of the virtual camera is selected to be as close as possible to all cameras of the camera array.

Example 46 includes the apparatus of any one of examples 36 to 45, including or excluding optional features. In this example, the means to synthesize a camera view is to synthesize camera views via content aware warping.

Example 47 includes the apparatus of any one of examples 36 to 46, including or excluding optional features. In this example, a video is rendered by compositing.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for high-speed video, comprising:
    a camera array, wherein each camera of the camera array is to capture an image at a different time offset resulting in a plurality of images;
    a controller to interleave the plurality of images in chronological order;
    a processor to enable view synthesis to synthesize a camera view from a virtual camera for each image of the plurality of images; and
    the processor to enable post processing to remove any remaining artifacts from the plurality of images and to generate a video with an adaptive frame rate from the plurality of images, wherein the adaptive frame rate is enabled, in part, by a mask applied to each image from the virtual camera.

2. The apparatus of claim 1, wherein post processing removes holes caused by synthesizing a camera view from a virtual camera.

3. The apparatus of claim 1, wherein post processing removes the remaining artifacts due to holes filled incoherently during view synthesis.

4. The apparatus of claim 1, wherein color mapping is used to reconcile color differences between each image.

5. The apparatus of claim 1, wherein the resulting frame rate is N times larger than the frame rate of a single camera.

6. The apparatus of claim 1, wherein each camera image has a different perspective compared to other camera images and synthesizing a camera view from each image results in a single view point.

7. The apparatus of claim 1, wherein the camera array is arranged to enable high-speed video, depth applications, and post capture photography.

8. The apparatus of claim 1, wherein a frame rate of a video rendered using the plurality of images is an adaptive frame rate, spatio-temporally varying in each frame, based on the amount of motion in regions of each image of the synthesized camera views.

9. The apparatus of claim 1, wherein a perspective of the virtual camera is positioned at the center of the camera array.

10. The apparatus of claim 1, wherein a perspective of the virtual camera is selected to be as close as possible to all cameras of the camera array.

11. The apparatus of claim 1, wherein the view synthesis unit is to synthesize camera views via content aware warping.

12. A method for high-speed video from a camera array, comprising:
    capturing a plurality of frames using the camera array, wherein each camera of the camera array is to capture a frame at a different time offset;
    stacking the plurality of frames in chronological order;
    synthesizing a view from a single perspective for each frame of the plurality of frames; and processing the synthesized camera views to remove artifacts in the images to render a slow motion video with adaptive frame rate based on a mask generated for each synthesized view.

13. The method of claim 12, wherein synthesizing the view includes hole-filling or inpainting for each frame.

14. The method of claim 12, wherein synthesizing the view includes content aware warping.

15. The method of claim 12, wherein synthesizing the view includes content aware warping, and wherein content aware warping comprises:
   obtaining a point correspondence between a frame and the single perspective;
   calculating a disparity to minimize a sum of squared differences between distortion terms;
   generating the synthesized view based on the disparity.

16. The method of claim 12, wherein synthesizing the view includes content aware warping that synthesizes a view based on a dense disparity map or a sparse point correspondence.

17. A system for high speed video from a camera array, comprising:
   a display;
   a camera array;
   a memory that is to store instructions and that is communicatively coupled to the camera array and the display; and
   a processor communicatively coupled to the camera array, the display, and the memory, wherein when the processor is to execute the instructions, the processor is to:
   capture a plurality of frames using the camera array, wherein each camera of the camera array is to capture an image at a different time offset resulting in a plurality of images;
   interleave the plurality of images in an order of capture;
   synthesize a view from a single perspective for each image of the plurality of images; and
   process the synthesized views to remove artifacts in the images to render a slow motion video with adaptive frame rate based on a mask generated for each synthesized view.

18. The system of claim 17, wherein processing the synthesized camera views removes holes caused by synthesizing a camera view from a virtual camera.

19. The system of claim 17, wherein processing the synthesized camera views removes the remaining artifacts due to holes filled incoherently during view synthesis.

20. The system of claim 17, wherein processing the synthesized camera views comprises color mapping that is to reconcile color differences between each image.

21. The system of claim 17, wherein an effective frame rate is N times larger than a frame rate of a single camera of the camera array.

22. The system of claim 17, wherein the camera array is arranged to enable high-speed video, depth image capture, and post-capture photography.

23. The system of claim 17, wherein the frame rate of the synthesized camera views is an adaptive frame rate, spatio-temporally varying across the synthesized camera views, based on the amount of motion in regions of the synthesized camera views.

* * * * *